US012755533B2

(12) United States Patent
Gillani

(10) Patent No.: US 12,755,533 B2
(45) Date of Patent: Oct. 6, 2026

(54) WEARABLE ASSISTIVE DEVICE

(71) Applicant: Ismat Saira Gillani, Columbus, GA (US)

(72) Inventor: Ismat Saira Gillani, Columbus, GA (US)

( * ) Notice: Subject to any disclaimer, the term of this patent is extended or adjusted under 35 U.S.C. 154(b) by 630 days.

(21) Appl. No.: 18/312,385

(22) Filed: May 4, 2023

(65) Prior Publication Data

US 2024/0371163 A1 Nov. 7, 2024

(51) Int. Cl.
*G06V 20/40* (2022.01)
*G10L 25/78* (2013.01)

(52) U.S. Cl.
CPC .............. *G06V 20/44* (2022.01); *G06V 20/41* (2022.01); *G10L 25/78* (2013.01)

(58) Field of Classification Search
CPC ........ G06V 20/44; G06V 20/41; G06V 10/82; G06V 20/10; G10L 25/78
See application file for complete search history.

(56) References Cited

U.S. PATENT DOCUMENTS

2019/0362149 A1* 11/2019 Mukhopadhyay ..... G06V 20/20
2021/0004589 A1* 1/2021 Turkelson ............ G06V 10/809
2021/0027759 A1* 1/2021 Ogawa .................... G10L 13/02
2021/0373656 A1* 12/2021 Watola .................... G06F 1/163

OTHER PUBLICATIONS

Guo, Chuan, et al. "Action2motion: Conditioned generation of 3d human motions." Proceedings of the 28th ACM international conference on multimedia. 2020. (Year: 2020).*
Wang, Gaojing, et al. "Impact of sliding window length in indoor human motion modes and pose pattern recognition based on smartphone sensors." Sensors 18.6 (2018): 1965. (Year: 2018).*
Jean-Baptiste, Emilie MD, and Alex Mihailidis. "Benefits of automatic human action recognition in an assistive system for people with dementia." 2017 IEEE Canada international humanitarian technology conference (IHTC). IEEE, 2017. (Year: 2017).*

* cited by examiner

*Primary Examiner* — Amandeep Saini
*Assistant Examiner* — Denise G Alfonso
(74) *Attorney, Agent, or Firm* — Smith Gambrell & Russell LLP

(57) ABSTRACT

This disclosure describes a device and a method for detecting video images of hand gestures and the environment around a user. The device and method process the incoming video images and classify the detected images as belonging to an action. The device and method further may predict the likely next action to be taken by the user. The device and method may communicate with the user to describe the current action being undertaken as well as the predicted actions likely to take place next. In an embodiment, the device may be worn around a user's neck with a forward-facing camera.

20 Claims, 7 Drawing Sheets

WEARABLE ASSISTIVE DEVICE

BACKGROUND OF THE INVENTION

The present invention relates to a device for recognizing hand gestures and an environment around a patient who may be suffering from dementia.

Millions of people worldwide are afflicted with dementia and Alzheimer's disease. These ailments can impair memory and make it harder to carry out daily chores, which can reduce independence and lower a person's quality of life.

Alzheimer's disease and dementia are two progressive conditions that can significantly impact a person's cognitive abilities and performance of everyday tasks. According to the World Health Organization, there were an estimated 50 million people living with dementia globally in 2020, and this number is expected to triple by 2050. Alzheimer's disease is the most common cause of dementia, accounting for 60-80% of cases. These conditions can lead to memory loss, difficulty communicating, difficulty thinking, and difficulty making decisions. As the condition progresses, individuals may need assistance with daily activities and may experience changes in their behavior and personality. These changes can significantly impact a person's independence and quality of life and can be difficult for caregivers to manage. For instance, a person may forget their current location or the task they are currently performing or forget their next task or their next destination.

Accordingly, a need arises for devices and techniques that assist a user in recognizing and recalling the tasks a user may be performing.

SUMMARY OF THE INVENTION

Aspects of the disclosure relate to systems and methods for identifying the task a person is performing and assisting the person in completing the task.

A device may comprise a sensor, a power source, and a computing device. The sensor may detect a series of images and send the images to the computing device. The computing device may receive and process the series of images and apply an algorithm to the series of images to classify the images as belonging to a selected action of a plurality of actions. The computing device may then communicate with a user the selected action. The computing device may also predict a likely following action and communicate the likely following action to the user.

The device may further comprise predicting the likely next action needing to be taken by the user. The device may further comprise a speaker which can be used to communicate the result of the classification or of the prediction to the user. The device may further comprise a second sensor for detecting and recording an audio input. The computing device may pre-process the detected series of images. The model applied to the images may comprise an encoder, a decoder, and a recurrent neural network. The device may learn over time by including the observed gestures of the user in training or updating the classification model. As the system is exposed to more of the user's daily life, its predictions of the upcoming actions may improve over time. The method may pre-process the detected series of images. The algorithm applied to the images may comprise an encoder, a decoder, and a recurrent neural network.

In an embodiment, the device may comprise a pendant, worn around a user's neck by a lanyard or as a necklace.

A method is described for classifying a series of images as belonging selected action of a plurality of actions. The method may comprise communicating the selected action to the user. The method may further comprise predicting the likely next action of the user and communicating this likely next action to the user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Figure 1:
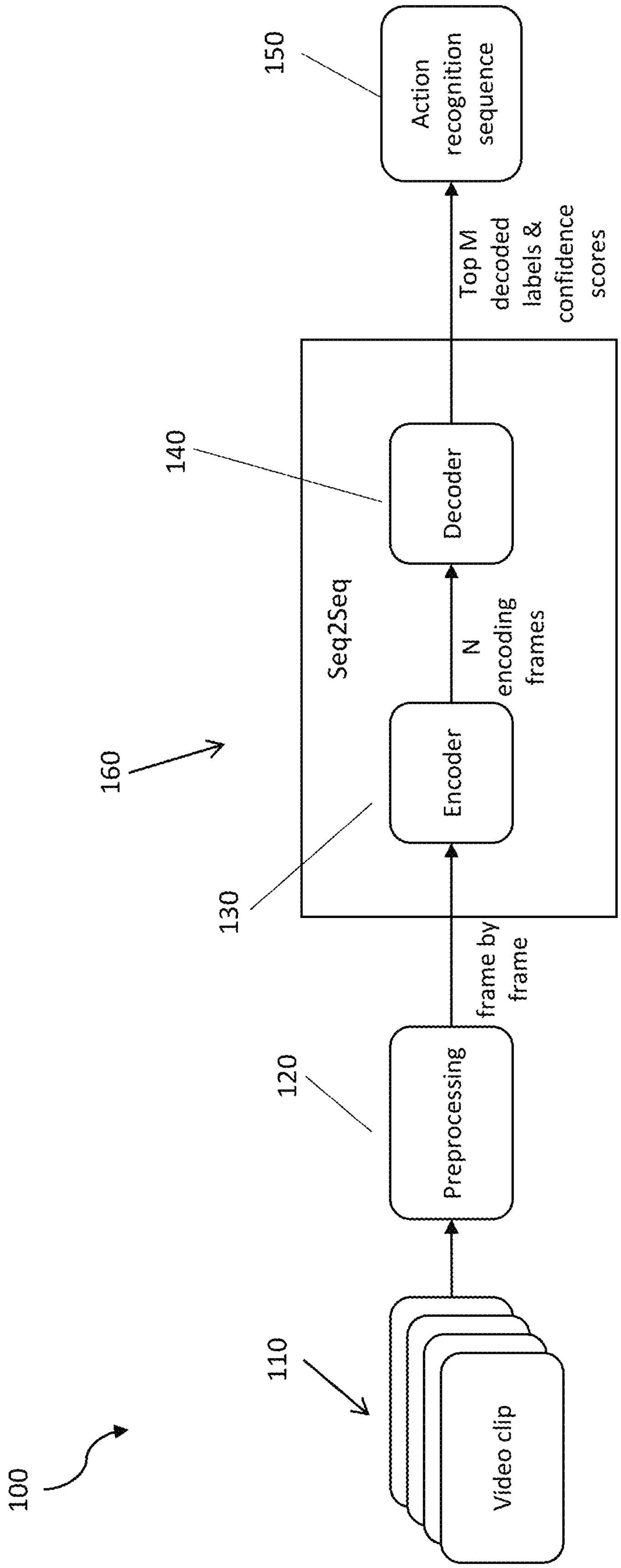
FIG. 1 illustrates an exemplary machine learning architecture for processing video images.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The present disclosure relates to a wearable assistive device which performs action detection and action recognition in order to advise the user of their environment and the ongoing task or the next expected task.

To address these challenges, the wearable device can assist individuals with dementia and Alzheimer's disease in performing everyday tasks. This device comprises a live built-in camera feed and utilizes advanced technologies such as computer vision and artificial intelligence to detect and recognize actions. By recognizing the tasks that the person is performing and reminding the person of the tasks being performed, the device will be able to assist a user in completing those tasks and maintaining their independence. This portable solution may be worn easily and has the potential to significantly improve the quality of life for patients with dementia and Alzheimer's disease, as well as provide much-needed support for their caregivers.

The device is designed to be worn by a user so that the device's camera can view the area in front of the user, especially where the user's hands may be performing a task. The device may detect and recognize human hands in front of the camera as well as other objects (e.g. plate, spoon, fork, newspaper, etc.). The device may then efficiently learn state-sensitive features and object affordances (regions of interaction and afforded grasps) purely by observing hands in the camera feed. These features and object affordances enable the device/system to "understand" the actions that a person is performing and to assist the user in completing tasks. Another important aspect of the device and method is determining the start time and the end time of the action in the scene. Once the scene's start and end times have been determined, then the method and device may predict the action category and provide appropriate assistance to the user based on this classification. By providing this information, the device may be able to assist patients more effectively in performing tasks and improve their quality of life. Overall, this wearable device has the potential to significantly benefit patients with dementia and Alzheimer's disease and help them maintain their independence.

Overall Process

There are four main steps in describing the overall process: data processing of the incoming video stream, a model comprising an encoder and a decoder, an action recognition model, and finally an advice/suggestion step.

The overall process 100 for classifying video clips as particular actions is shown schematically in FIG. 1. A series of video frames 110 is detected by a sensor (e.g. a camera) and transmitted to a processing unit. As the frames 110 are received, they may undergo a pre-processing step 120. A pre-processing step 120 may operate on each frame as it is received and may comprise any of various transformation applied to an image. Pre-processing 120 may also include removing a certain number of frames to make the analysis more tractable in terms of time and computing resources. Once each frame has been pre-processed the resulting video frames may be sent to an encoder 130, which may itself be part of a sequence to sequence model 160 (Seq2Seq). The encoder 130 may receive as input pre-processed video frames and output a set of embeddings which may encode the N frames the encoder 130 has received. The decoder 140 may receive as input the embeddings and the decoder 140 may output the various possible labels for the video clip 110, along with a confidence score for each of the labels. At 150, the action recognition sequence/model identifies the most probable action detected by the video clip 110 and may also provide advice or suggestions to the user.

Together the encoder 130 and the decoder 140 create a sequence to sequence ("seq2seq") system 160 which, along with the action recognition system 150 may identify human activities from an incoming video clip. The seq2seq encoder-decoder models work with video transformers to detect action in live video by analyzing the sequence of frames in the video and creating a context representation of the inputs, called an embedding. The encoder processes the input frames and captures the relevant context, which is then passed to the decoder. The decoder uses this context representation to generate a prediction for the human action being performed in the video. The device may use vision transformers which consist of encoders and decoders. Seq2Seq is a method of encoder-decoder that maps an input of sequence to an output of sequence with a tag and attention value. Seq2seq is a model that incorporates image features with a sequence to sequence transformer generator.

Video Processing

The device comprises a camera or a sensor which can detect images. Each frame of the image stream will be processed on the pixel level. First, the video stream is preprocessed and prepared frame by frame (and sometimes pixel by pixel within each frame) by transforming it into an acceptable format. Later on, that data will be fed to the seq2seq block that has an encoder and decoder In image processing there are many transformations which may be applied to an image prior to subsequent analysis or feeding the image to a subsequent process step. Some of these transformations comprise segmenting, filtering, pixel brightness transformations, brightness corrections, or cropping of the image, amongst others. Some of the most relevant for this application are down-sampling the video stream, identifying the region(s) of interest, cropping the image to include mostly the region(s) of interest, and re-sizing the image for the encoder.

A video clip 110 may depict one second of video, or the video clip may depict a set number of seconds (e.g., 0.1, 1, 10, 100, 1000 seconds). Similarly, the video clip 110 may comprise a set number of frames, such as 10 frames, 15 frames, 30 frames, or 10,000 frames. (The maximum number of frames the system can process is likely to be limited by the amount of processor-accessible memory available in the device.) As part of preprocessing 120, the method or system may select every other frame, or every third frame, or every nth frame to be sent to the encoder 130 In an embodiment, the video may be recorded at 30 frames per second (fps), but then down sampled to yield a 15 fps video. Down-sampling can help reduce the computer resources required to perform subsequent processes on the video stream.

Because an encoder 130 requires its inputs all to be the same size the output of the pre-processed video should be an image of a known size or a series of images of a known size. In theory, any sized image can be used so long as the encoder is set to receive images of at least the largest size produced; however, the computer resources required to process such an image must be balanced with the other needs of the device-such as size and power consumption. Re-sizing the image may involve automatically increasing or decreasing the size of the image to a selected size. For example, if the camera records video images of size 1200 pixels by 1900 pixels, the images may be automatically re-sized to 224 pixels by 224 pixels, In some instances, the images may be cropped to this size, but in others, the cropped image may be too small or too large and will itself need to be re-sized.

In an embodiment, the encoder may require a fixed-size input (e.g., images of precisely 224×224 pixels) for each video frame. If the input video frame size is larger or smaller than the fixed-size input (e.g., 224×224), the frame may be resized to fit the model input size using standard image resizing techniques. In this example, if the video frame is larger than the fixed-size input, the most important part of the frame may be identified, centered, and the frame may be cropped to the appropriate fixed-size. This technique is called center cropping. If the video frame is, for instance, smaller than the fixed size, it may be resized appropriately.

In a later section, more details about a sliding window approach will be discussed. A sliding time window or a sliding number of frames may be selected for processing, so the number of frames in a video clip may vary. In an embodiment, the embeddings determined by the encoder may be averaged before being sent to the decoder.

The cropping process may be done using pre-defined cropping parameters that are specific to the model architecture. These cropping parameters may be defined in a model configuration file and may be based on the assumption that the most important part of the image is located at the center.

If the cropping is done incorrectly, it can result in sub-optimal performance of the model.

These cropping and resizing operations are typically done as part of the pre-processing step before the video frames are fed into the model. The output of the pre-processing step may be a set of fixed size (e.g., 224 px by 224 px) images that are then fed into the model.

Object Detection/ROI Determination

If the wrong area is cropped, the model may not be able to recognize the actions correctly or it may provide incorrect results. Therefore, it is important to ensure that the area being cropped contains the relevant part of the video frame that is necessary for action recognition. One way to mitigate this risk of incorrect identification of the most important portion of an image is to use object detection algorithms to identify the region of interest in the video frame before cropping it for input to the action recognition model.

Encoder

The encoder step may process a frame (or frames) and produce an embedding. After an embedding for each frame is determined, the system may average several of the single-frame embeddings within a time window, prior to feeding the resultant embedding into the decoder.

The encoder may receive as an input a tensor which represents a number of frames from the video stream. An input tensor may be in the format [B×C×H×W], where B is the batch size (Batch size may refer to the number of training examples utilized in one iteration), C is the number of channels, H height of the frame, and W is the width of the frame. In an example, the input to the encoder can be [NF×3×224×224], where NF represents the number of frames. In an embodiment, the sensor may use an RGB format, so there are 3 channels for the intensity of each of those three colors. In another embodiment, there could be a monochrome sensor which would have a single number of channels. In another embodiment, there could be more than 3 channels, for instance, RGB+ and IR sensor. The encoder may output a tensor with the shape [1×512×1×1], representing the embedding of the processed frame. The value 512 is not inherently special, and it could be a different value depending on the specific architecture of the encoder model. However, in this example, the value of 512 represents the size of the embedding output by the encoder for the processed frames. This value may be chosen based on empirical testing and tuning of the model architecture, and other models may have different output sizes for their embeddings.

In general, an embedding is a dense vector representation of an input that captures relevant information about the input. Embeddings are commonly used in machine learning and natural language processing tasks to represent words, sentences, or other types of data. The size of the embedding can vary depending on the specific task and architecture. The goal of embedding is to map the discrete entities to points in a high-dimensional space in such a way that the distance between points is indicative of the similarity between the entities they represent.

The encoder may comprise one or more video transformers or vision transformers. The encoder processes the input video frames and generates embeddings that can be used for downstream tasks like action recognition.

Video transformers are a type of neural network architecture that is specifically designed for processing sequential data, such as video frames. They may use self-attention mechanisms to analyze the relationships between different frames in the sequence and capture long-range dependencies. This allows the model to better understand the context and dynamics of the video, which is important for accurately detecting and recognizing actions.

Transformers are a type of artificial neural network architecture that is used to solve the problem of transduction or transformation of input sequences into output sequences in deep learning applications. Vision transformers (ViT) have extensive applications in image recognition tasks such as object detection, segmentation, image classification, and action recognition. They outperformed CNNs in image classification tasks. There are several types of ViTs, like uniform scale ViTs, multi-scale ViT, hybrid ViTs with convolutions, and self-supervised ViTs. In an embodiment, the device may use "hybrid ViTs with convolutions"

The video transformers and vision transformers (ViTs) may be used as part of the encoder in a video processing pipeline. The encoder processes the input video frames and generates embeddings that can be used for downstream tasks like action recognition. In an embodiment, the video transformers and ViTs may be part of the encoder module used in the device.

The model is based on the encoder and decoder architectures. The specific model that will be used in the system will consist of convolutional neural networks (CNNs). While Transformers can be used for object detection and recognition tasks, other ML tools are used for other tasks.

Decoder

The decoder accepts at least one embedding from the encoder. In an embodiment, the decoder may accept a stack of frame embeddings that have been calculated by the encoder (e.g. action-recognition-0001-encoder) and may generate a classification of the video input. The decoder may accept as input an embedding produced by the encoder. In an example, the embedding may be in the shape [1×16×512]. Such an embedding of a frame is in the format [B×T×C], where: B=batch size, T=Duration (e.g. number of frames) of the input video clip, and C=dimension of the embedding. In this example, the batch size is 1, the duration of the video clip is 16 frames, and the dimension of the embedding is 512. In an embodiment, the frame embeddings that have been calculated by the encoder may then be stacked together in a temporal manner to create a tensor.

The decoder may apply some temporal processing on the stacked embeddings, such as temporal convolution, pooling, and normalization, to extract features from the input frames over time. The decoder may then use the processed features to classify the actions in the video. This is typically done by passing the features through a fully connected layer and a softmax layer to get the classification scores.

In an embodiment, the decoder may use PyTorch as a machine learning (ML) framework and may give as output a tensor with the shape [b×400], wherein each row (of the 400 in this example) is a logit vector of performed actions and where b represents the number of input examples processed in parallel. Each row of the output tensor represents a logit vector for the performed actions in a single input example. A logit vector is a vector that represents the raw output of a neural network before it is passed through a softmax function. A logit vector has the same dimension as the number of classes in the classification problem. Each element in the logit vector represents the raw output or the "score" of a particular class.

Key Action Identification

These architectures are designed to handle sequential data such as videos, by capturing the temporal dependencies between the frames in a video. This allows the model to better understand the context and dynamics of the actions in the video. Another way in which an AI model may handle such a classification task is by using attention mechanisms that allow the model to focus on specific parts of the input, such as the keyframes or the most important actions. This may allow the model to better handle unique work by focusing on the relevant information and ignoring the irrelevant information.

The attention mechanism may be implemented in various ways depending on the specific architecture of the model. In general, an attention mechanism allows the model to assign weights to different parts of the input data, indicating their relative importance to the task at hand. These weights can be used to selectively amplify or suppress the contributions of different parts of the input when computing the model's output.

One way to identify the relevant parts of the input data for the attention mechanism is to use pre-defined heuristics based on domain knowledge or prior experiments. For example, in the case of video classification, the keyframes or the most important actions in a video may be identified based on the position of the camera, the duration of the action, or other criteria.

Another way to identify the relevant parts of the input data is to use a learned attention mechanism that is trained jointly with the rest of the model. In this approach, the attention weights are learned by the model during training, based on the correlation between different parts of the input and the model's output. This approach does not require prior knowledge about the domain or the input data, but it may require a large amount of training data and computational resources to train the attention mechanism effectively.

Action Recognition Sequence/Process

Figure 2:
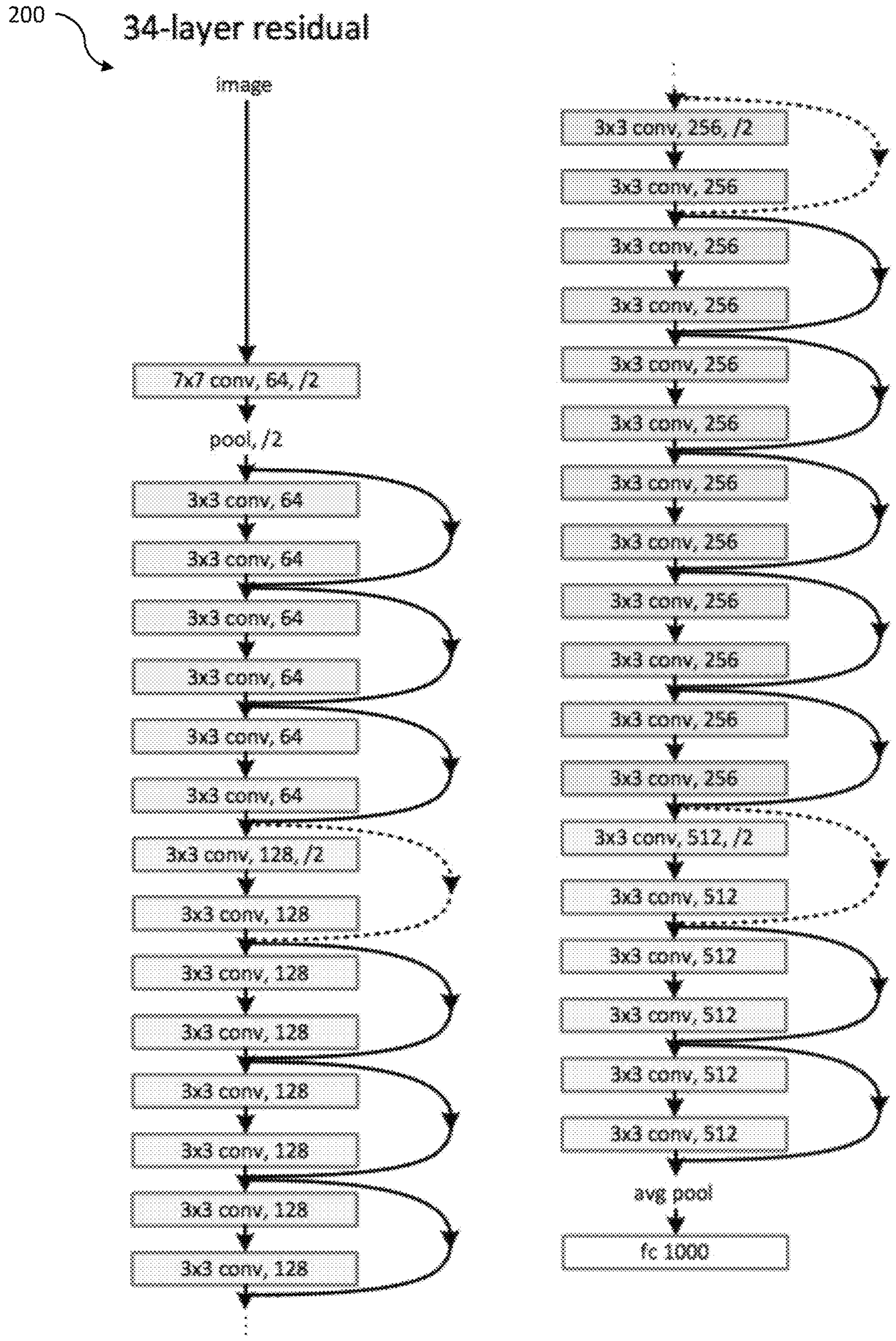
FIG. 2 illustrates the model architecture of ResNet34, an exemplary AI model.

In an embodiment, a general-purpose action recognition model may be used such as a video transformer approach with a ResNet34 encoder, as illustrated in FIG. 2. The encoder part may have an architecture that utilizes both video transformers and a convolutional neural network 200 (e.g. ResNet34) and may create a sequence from the video frames in the form of video embeddings. In the example convolutional neural network in FIG. 2, "pool" represents a pooling layer of the model, "conv" represents a convolutional layer, and "fc" represents a fully connected layer. In this example, the fully connected layer at the end has 1000 outputs, but other numbers may also be used. This sequence may then be fed to a decoder for further processing and predictions. In an embodiment the convolutional neural network 200 may be ResNet 34 because it has a low error rate, fast processing, and a high prediction accuracy. It can efficiently learn all the parameters from early activations deeper in the network. In other embodiment, alternative CNNs 200 may be employed for the same purpose.

After preprocessing the training data, the trained AI model (e.g. such as an ARM encoder and decoder) may be applied to an incoming set of video clips (a video stream) to recognize the classes of the actions being done in them.

Identifying Start and End Frames of an Action

One part of the process of labelling a series of video frames may comprise identifying the start frame and the end frame of the action. This identification may comprise looking at a series of sliding windows of video clips and determining when the probability that a sequence of such video clips is correctly labelled as one action varies by a certain amount. Identifying the start frame and end frame of an action is important for accurately labeling the video clip with the corresponding action. It allows for a more precise determination of when the action began and ended, which can be useful in cases where the action is short-lived or there are other actions occurring in the video clip.

If the method includes classifying every second of what the camera detects, it is still important to identify the start and end frames of an action so that the action can be accurately timed and reported to the user. If two actions are above a threshold confidence score, it may be difficult to determine which action is being performed, and this should be reported to the user. In an embodiment, the advice to the user may comprise a message that the user is likely engaged in one of two (or one of several) tasks and listing the actions identified with a high enough confidence score.

The selection of start and end frames can occur at the local level during the processing of the video clip. It may also be part of the training process to help the model learn how to accurately label actions in video clips.

Sliding Window Approach

A sliding window approach may be used as part of the video analysis of tasks, including action recognition and detection. This approach enables the processing of a video sequence in small segments or sets (time windows or windows of a set number of video frames) and may predict the action label for each window. By dividing the video sequence into small segments and processing each segment independently, the model can capture more fine-grained information about the action taking place and also can handle actions that have different durations.

In the context of action recognition, the sliding window approach is particularly important for identifying the start and end times of action. By thresholding, the probability distribution of actions predicted for each window, the start and end times of the action can be determined based on the windows in which a selected action is predicted with high confidence, or in which selected actions are predicted with reasonable confidence.

Figure 3:
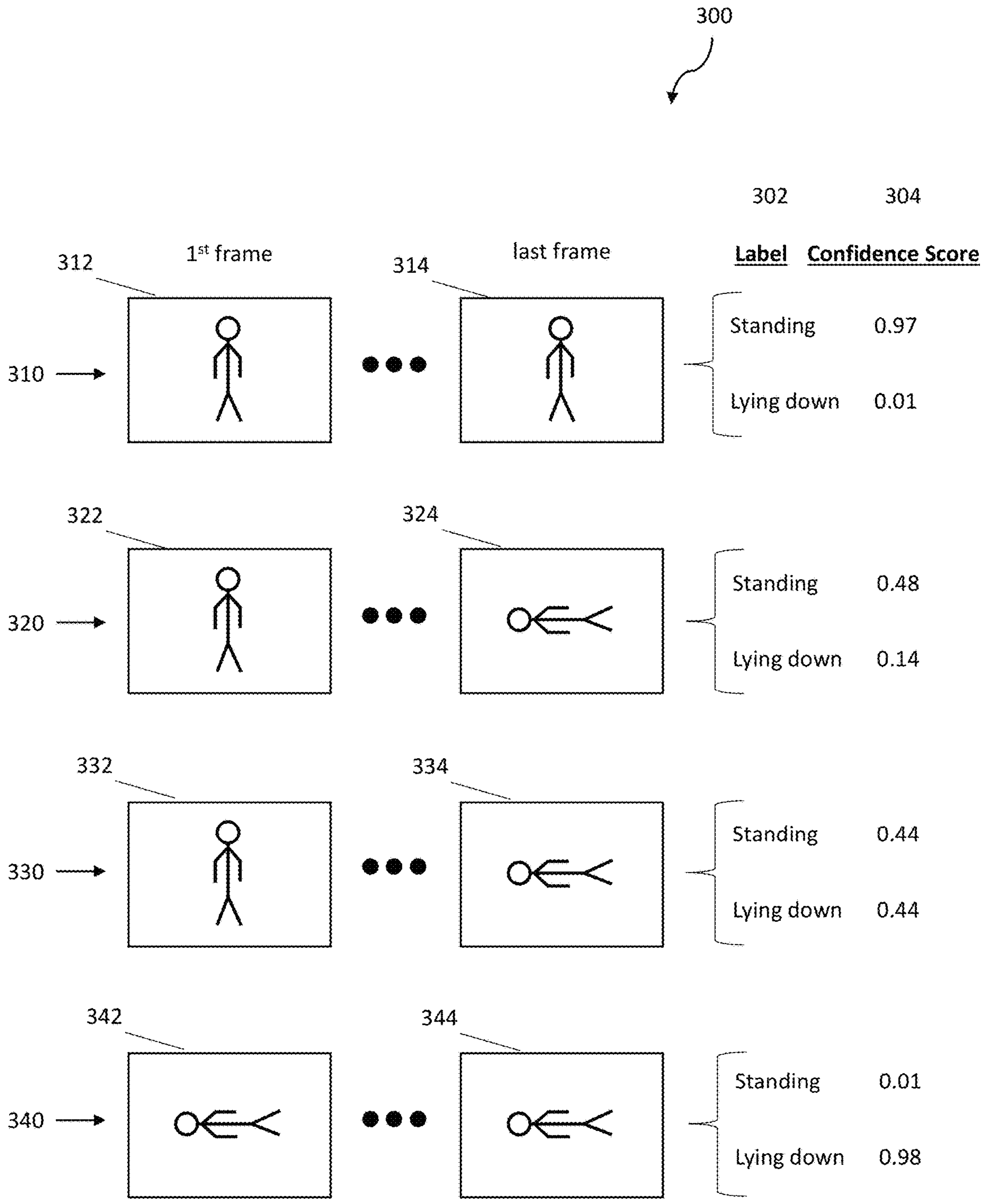
FIG. 3 illustrates labeling of a video stream along with a confidence score.

FIG. 3 depicts an example showing four video clips: 310, 320, 330, and 340. For simplicity in this example, only the first frame 312, 322, 332, or 342 and the last frame 314, 324, 334, or 344 of the video clip are shown, but there may be many more frames than just these two. In the first video clip 310, the person is standing in very frame of the video clip. In the second video clip 320 approximately three quarter of the frames show a person standing and one quarter of the frames show a person lying down. In a third video clip 330, half the frames show a person standing and half show a person lying down. In the fourth video clip 340, the frames only show a person lying down. A labelled action 302 and the confidence score 304 associated with the labelled action 302 are shown for each of the video clips 310, 320, 330, and 340. For the first video clip 310, the label "standing" is identified with a high confidence score (97%) and the "lying down" label is identified with a low confidence score (1%). For the second video clip 320, the label "standing" is assigned a confidence score of 48% and the label "lying down" is assigned a label of 15%. In the third video clip 330 the label "standing" and the label "lying down" are both given a confidence score of 44%. For the fourth video clip 340, the label "standing" is assigned a confidence score of only 1% and the label "lying down" is assigned a confidence score of 98%.

The seq2seq module applied to the third video clip 330 identifies both labels "standing" and "lying down" of the clip with a high confidence score of 44%. (In reality the precise confidence scores are not likely to be precisely the same value.) In an example, if a threshold value for identifying a particular action is for that label to have a confidence score equal to or above 30%, then the system would identify the action for the third video clip 330 as either standing or lying down but may also report to the user both of those actions and also that the action identification was not entirely clear.

By looking at the assigned confidence scores for a series of sliding windows, as shown in FIG. 3, it may be possible to assign a start time and an end time to an assigned or identified action. For example, the person may have started standing in frame 312 and kept standing until between frame 322 and frame 324. The second video clip 320 and the third video clip 330 both capture video of the person standing (video frames 322 and 332) and also capture video where the person is lying down (video frames 324 and 334). In between the second video clip and the third video clip also capture video (not shown in the figure) where the person stopped standing and started lying down. By modifying the time window used for classifying the videos, the system can identify the likely frames when the person was only standing or only lying down and thus identify the start and stop frames of the identified actions.

The sliding window approach involves processing the video frames in small segments or sets (time windows) and predicting the action for each window. The start time and the end time of the action may then be determined by identifying the windows in which the action is predicted with high confidence. For example, standing is identified with high confidence for first video clip 310, but standing is identified with only moderate confidence for the second video clip 320 and for the third video clip 330 and with very low confidence for the fourth video clip 340. The sliding window aspect may also vary the duration of the window. For instance, some actions (e.g., sitting at a table) may continue for a long time—many video frames—but some actions (e.g. taking a medication orally) may take place over a brief time—very few video frames.

The sliding window approach may be implemented by dividing the series of video frames into time windows of, for example, a fixed size (e.g. a fixed number of frames per time window) and then running the action recognition model on each window. The model may then output a probability distribution for the action in each window. By thresholding, the probability distribution over the actions taking place may be identified as well as assigning the start and end time of the action. By identifying those windows in which the probability of assigning that window to a certain action exceeds a certain threshold, the start and end time of the action can be determined, as outlined above and in reference to FIG. 3. It is also possible to use a varying window size, which can help to capture actions that start and end at different points in the video, as well as to handle actions that have different durations. It is also possible that multiple actions receive similar confidence scores, as noted above, in which case the time window may be modified. If multiple actions receive similar confidence scores, then the time window may be modified or other techniques may be used to better differentiate between the actions. For example, if at least two actions are assigned probabilities which are very close, it may be necessary to analyze the content of the video frames within the window to better differentiate between the two actions. In another embodiment, the system may report both actions to the user. Ultimately, the goal is to correctly identify the action with the highest confidence score, and to provide information to the user when multiple actions cannot be clearly differentiated.

The device may assist individuals with memory loss in maintaining their independence. The device may track hands and objects and may also recognize object-based human actions (e.g. lifting a cup to drink, shaking hands, hugging, knitting, etc.). This ability to recognize and classify human actions allows the device to detect and recognize objects in the field of view of the camera/sensor and to provide, for example, verbal instructions to the user. In addition, the system has the ability to extract and recognize text from images, which can help individuals remember important information or to be reminded of important information. Another key feature of the device is its ability to predict hand motion trajectories and future contact points on active objects in the field of view of the sensor. For example, the device may detect the user's medication bottle and remind the user that of the correct dose.

The system may also include episodic memory which includes information about recent or past events and experiences.

Training the AI model/Action Recognition Model

The Action recognition algorithm model may be trained on a large dataset of video clips which are first pre-processed, then input to the encoder which provides input to the decoder, which, in turn, provides input to the action recognition model. In an embodiment, the AI model, also called the Action Recognition Model, may be trained on the Kinetic 400 dataset with has 400 general purpose human action classes and has over 400 realistic video clips per class. Alternative datasets may also be used for training, such as the Ego4D dataset. This exemplary dataset contains more than 650,000 video clips of actions such as playing a musical instrument, hugging, shaking hands, washing utensils, and the like.

Figure 4:
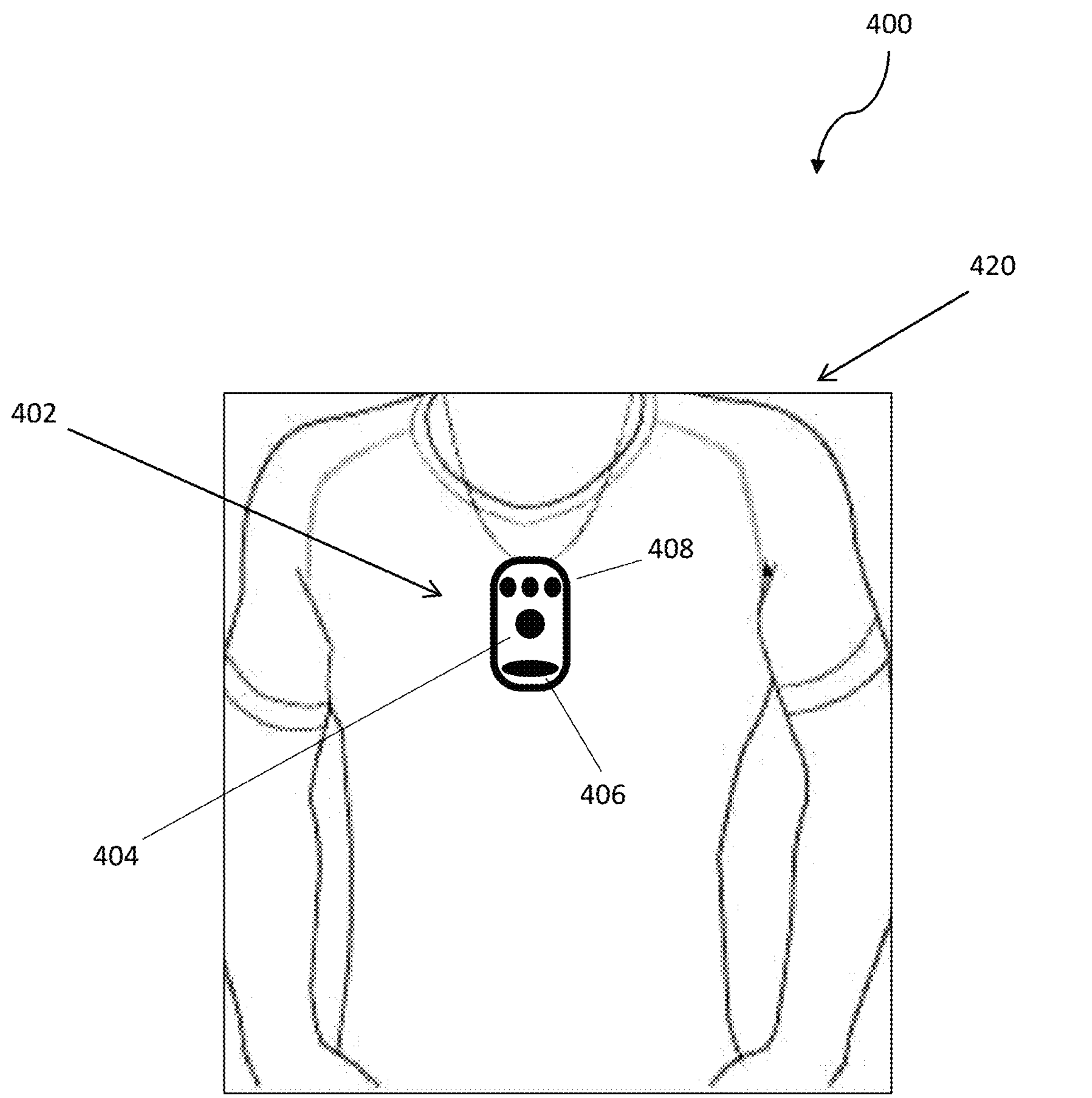
FIG. 4 illustrates an exemplary device as worn by a user.

Before being integrated with a device, the AI model may be trained. Thus, in a preparatory step, the model may be trained on a large training dataset to classify video clips of known activities. Such a training process may be very resource intensive taking much time, computer memory, and computer processing power and can occur on a different platform with the appropriate resources. For example, the AI model can be trained on a remote server in the cloud and then the trained model can be transferred to a smaller device for use. Once such a model has been pre-trained, it can be deployed on edge devices (e.g. devices with much fewer computing resources). FIG. 4 depicts an example system 400 including being worn around the neck of a user 420. In the example illustrated, the system 400 comprises a pendant 402, worn by a user 420. Various additional elements on the pendant 402 are also depicted such as a camera 404, a speaker 406, and microphone receivers 408. Other embodiments may comprise more or fewer elements visible on the front surface of the pendant 402, as described elsewhere in this disclosure. The total time to train depends on the processing units, memory, and time involved and may take up to weeks depending on the size of the training data set. Once the model has been trained, the model can be deployed on devices of much less complexity and which can classify actions from videos in a very short time. The model can be used to deploy on edge devices.

To handle this unique work, the AI model on the device requires an initial training on a large dataset of videos, which will allow the AI model to generalize well to new and not-yet-seen video clips. The model can also be fine-tuned on specific datasets to adapt them to a particular domain or task. For example, if the user enjoys knitting, then the AI model may be trained on additional knitting tasks, or the video training dataset may include additional knitting-related actions. If the user never knits, the knitting-related videos may be omitted. In fact, including such specific labels can help the AI model learn and recognize more precise and detailed actions, making it more tailored to the user's needs and preferences. The key is to have a diverse and representative dataset that includes a wide range of actions and activities that are relevant to the user.

What about odd cases?

In this context, "unique works" likely refers to activities or tasks that are not part of the general training dataset and may be specific to a particular user or domain. These activities may be rare or uncommon and may not have been included in the training data used to develop the AI model. As a result, the model may not be able to classify these activities accurately, or assign a high probability to the correct label. As described in reference to FIG. 3, the model may have cases which it cannot classify with high enough confidence. In other instance, the "unique works" here may refer to activities that the model has not seen before or have not been included in its training dataset.

One way that the AI-models in device can handle unique works is by using temporal convolutional networks (TCN) or 3D CNNs as the core architecture.

Advice/Suggestions/Narration: Actions Taken in Response to Action Recognition Once the current activity of the user has been identified, the system may be able to respond to a spoken query from the user. In an embodiment, the system may quietly narrate what it has identified as the ongoing activity or task. In an embodiment, the system may be able to answer a spoken language query as well. For instance, if a user is in a room and asks a question like, "What color are the shoes" the algorithm will be able to answer the question by recognizing what the user is asking, reviewing the video to identify the item, identifying the associated time instances when the item is in view, and responding to the query. The system may also be able to answer moment queries as well by temporarily localizing the activity of interest. For instance, the questions like, "when did I fold clothes" may be answered with "one hour ago" or "yesterday morning." In an embodiment, the user may ask a question such as "What am I doing now?" to which the system may respond with the identified action (e.g. "waiting for your ride to your grandson's birthday party" or "folding laundry").

The system may include additional outside information in the classification and prediction steps. The device may have access to the user's schedule or calendar, so that it can remind the user of an upcoming appointment or event. For instance, knowing a user's medication schedule can help a user by reminding the user that they are overdue to take their medicine each day or reminding the user at the appropriate time and to take a certain medicine.

By viewing and recognizing text in the field of view of the camera, the system may help the user to remember important information or to provide the user with a reminder based on that information. For example, if the user has a reminder note with instructions on how to take their medication, the device can read the text and provide verbal instructions to the user. The recognized text could be used to help the user remember important details about their day, such as an upcoming meeting or an important task that needs to be completed. Ultimately, the exact use of the recognized text will depend on the specific design and functionality of the device.

This device may be especially beneficial for visually impaired individuals, as it can assist with visual forecasting tasks with minimal supervision. The embedded AI model may initially be pre-trained on a basic set of images, videos, and actions along with instructions which may be provided to a user. However, the device and method may also learn more parameters on the fly and become better trained based on a particular individual user's past activities allowing the device to more accurately predict the user's future moves over time. Such training may take place only at certain times of day (e.g. between midnight and 3 am) or when there is access to certain resources (e.g. wired internet connection, or only when the battery is being charged).

Additional/Optional Functions & Elements

In addition to the video capabilities and processing described above in this disclosure, the device may have other specific functions it can accomplish. For example, the device may have optical character recognition (OCR) capability for reading and recognizing text within video frames. The device may have object tracking with both 2D and 3D capabilities (the latter if the device has multiple sensors and so can make use of accurate depth perception in addition to using advanced filtering, post-processing, and RGB-depth alignment. Advanced computer vision capabilities may include such capabilities as image warping, de-warping, resizing, cropping, edge detection, and feature tracking, for image processing and object recognition.

In an example, the main board may comprise a Robotic Vision Core (RVC) AI board with a powerful processor and 4 TOPS of processing power, including 1.4 TOPS specifically for AI, and support for multiple encoding formats and video resolutions. In order to reduce memory usage and provide for as portable a device as possible and also to minimize energy consumption to prolong the useful battery life, compression algorithms may be employed for any files stored on the device. The action recognition models can be customized, as noted above, to handle unique works and learn from user-specific actions over time. In addition, in an embodiment, the device can be integrated with other sensors or devices, such as microphones or wearables (e.g. medical data trackers), to capture additional information about the user's actions and context.

In an embodiment, the device may include an inertial measurement unit or a satellite navigation system (e.g. GPS, GLONASS, Galileo, BeiDou, etc.) or both. These devices may enable additional functionality by providing additional information which could be incorporated into the AI model along with the video information.

In an embodiment, the device may include illumination. The illumination may comprise visible lights or infra-red lights, or lights of other wavelengths. For example, the device may comprise visible light emitting diodes (LEDs). The device may also comprise IR LEDS or IR sensors or both, which may supplement the user's vision at nighttime to let the user know about obstacles in the user's walking path. For example, at night the IR sensor may correctly identify a user's pet and warn the user about a potential collision. In an embodiment, the device may be able to see areas in the 0-5 meter range from the user, while employing IR-assisted night vision capabilities.

Attention mechanisms and temporal convolutional networks (TCN) for handling sequential data and focusing on relevant information.

Optical Character Recognition

In an embodiment, the device may also comprise the ability to perform optical character recognition (OCR) on a video frame or frames. Performing OCR may enable the device to read aloud, for instance, labels of medications, labels on jars or other packages, newspaper headlines, a hand-written calendar, etc. The recognized characters may also enrich the video clip information being fed into the encoder when creating the embeddings. In an example, the video clip may use the recognized characters to distinguish various actions (e.g. "taking medication A" vs. "eating candy"). In an embodiment, the OCR aspect may comprise various forms of image processing to enable the recognition of characters. For example, the device (e.g. an AI board) may be equipped with advanced computer vision capabilities. The advanced computer vision capabilities may perform a variety of image manipulation functions, such as warping, de-warping, resizing, and cropping, as well as edge detection and feature tracking as part of the OCR process, or even distinct from the OCR process, as part of creating the embeddings which are fed into the decoder for classifying the user's ongoing action(s). These computer vision capabilities may include:

1. Warping an image for image registration, object tracking, and panorama stitching,
2. De-warping an image to, for example, correct the distortion caused by warping,
3. Detecting an edge to identify the boundaries of objects in an image, Other computer vision capabilities may also comprise image segmentation, object tracking, and feature extraction.

These functions would be used to manipulate the image and extract the text for OCR, and the recognized characters could be used to enrich the video clip information being fed into the encoder when creating the embeddings. An OCR module may operate separately from the video classification task. The OCR module would likely be responsible for recognizing characters and converting them to text, while the video classification module would be responsible for analyzing the video frames and predicting the user's ongoing action(s).

These techniques may also be used as pre-processing steps to improve the performance of machine learning models in computer vision tasks.

Additional information

In an embodiment, the device may integrate other information into the information sent to the encoder for creating an embedding. For example, the user may have an electronic calendar, in which may be recorded a particular time, date, or location, when the user is expected to be somewhere and doing a particular activity. For instance, a user may have a regular quilting class every Monday at 2 pm, or the user may have a grandchild's birthday party at a particular address. These additional sources of information may supplement the video clips used as part of the action recognition model.

Example Implementation

The ultimate purpose of this device and method is to detect and recognize a certain task being done by the person and when needed, to help the person to complete the task. The device can recognize live human actions by using vision transformers and the Action Recognition Models architecture, as described above.

The device may comprise on board chip capable of doing many operations per second (e.g. 4 trillion operations per second=4 TOPS) and there will be no need of any additional fast or special processors. In an embodiment, the device may have an on-board memory bandwidth of at least 450 GB/sec. The AI model may initially be trained on a high performance GPU before being ported to the device. Only after the model has been trained is it then deployed on a wearable AI device. For updates and fine tuning a new or updated model may be supplied as needed. The wearable device 402 can be in communication with other computers by a communication network, for instance, for updates to the trained model or for access to additional information.

In an embodiment, the device 402 may comprise a battery 524, a camera (or other sensor) 502, and a computing device 600 which can perform artificial intelligence type calculations. The computing device 600 may receive live feed input from a camera & process it using high-end neural networks simultaneously. The device 402 may also comprise a speaker 506 for communicating with a user by audio means or a display for displaying information. The device may also comprise a light source 520, 522 for illuminating an area.

The battery 524 is a vital component of the device 402, as it provides the necessary power to keep it functioning. In an embodiment, a compact lithium-ion battery may be chosen for this purpose, preferably with a long lifespan (e.g. >3 years). An exemplary battery may have a voltage of 5V, a maximum current of 3 amperes, and a power output of 20 watts, with a capacity rating of 3000 mAh. A lithium ion battery's small size and high performance make it an ideal choice for the device, ensuring that it can run smoothly and efficiently for an extended period of time.

In an example device, the camera 502 may be the MHDYT mini spy cam which can capture high-quality full HD video and photos, with a resolution of 1920×1080 pixels at 30 frames per second. This example camera also features enhanced night vision which can provide a clear image even in low-light conditions, when used in conjunction with an IR light source 520. The camera 502 itself may have a separate, built-in, rechargeable battery. The camera battery may enable the camera to take video independently of the power source of the overall wearable device 402. The entire device 402 may have a "rest mode" when it operates under reduced power. In an embodiment, when the video camera 502 detects no motion for some time period, the entire device may go into "rest mode". The camera battery may also support working while charging, making it a reliable choice for continuous use. The camera 502 may have a loop recording feature and may have a motion detection feature, which help to save storage space and make it easier to use. The device may support micro SD cards as part of the information storage. For example, a micro SD may provide a minimum capacity of 4 GB and a maximum capacity of 32 GB. Alternatively, other electronic storage media may be employed.

In an example, the computing device (e.g. the AI board 512) selected for the product may be based on, for example, the Robotic Vision Core (RVC), which provides a powerful and flexible platform for developing intelligent systems. This AI board 512 may be equipped with, for example, a processor with 4 TOPS (Tera Operations Per Second) of processing power, including a set amount of processing power (e.g. 1.4 TOPS) specifically for AI, which enables it to run nearly any AI model, including custom architectures.

The AI board 512 may support multiple encoding formats, including H.264, H.265, and MJPEG, and is capable of capturing video at 4K resolution at 30 frames per second or 1080P resolution at 60 frames per second. As noted above, storing such a large amount of video may require using compression algorithms that can be used to compress the media files (images, videos).

In an embodiment, the device 402 may also support stereo depth perception, with advanced filtering, post-processing, and RGB-depth alignment capabilities. The board's Object-Tracker node may enable both 2D and 3D object tracking, making it a powerful tool for a wide range of applications. With these advanced capabilities, the AI board 512 is well-suited to support the development of intelligent systems that require sophisticated image and object processing capabilities.

Object tracking can help to identify and track specific objects or regions of interest within the video frames, which can provide additional information that can be used to classify actions. For example, if the device is being used to monitor cooking activities, object tracking could be used to track the movement of a person's hands or utensils as they prepare a meal, providing additional information that can be used to classify the actions being performed.

These object tracking capabilities are generally considered to be sub-routines that are incorporated into the AI model, rather than a separate subset of the model. The AI model may use the object tracking information in combination with other features extracted from the video frames, such as optical flow or object detection, to classify the ongoing action.

In addition, the object tracking capabilities can be used to improve the accuracy and efficiency of the AI model. By tracking specific objects or regions of interest within the video frames, the model can focus on the most relevant information, rather than being overwhelmed by irrelevant or distracting visual cues. This can improve the model's accuracy and reduce the amount of processing power required to classify the actions being performed.

The system will be working in the same environment and predicting similar kinds of scenarios. So, it will start giving more accurate predictions over time. As the videos will be recorded and sent back to the system for retraining. For improvement and updating the model for new scenarios videos can be recorded and the model will be retrained.

The models may accumulation additional information which may stay on the local device only, and the device may have enough resources to retrain the model. The device may also transfer the additional accumulated information to a remote computer which can provide a new and improved model to the local device in the form of a firmware update. The improvement videos can be selected based on relevance and stored on the local device before being transmitted to a server for storage and processing.

In an embodiment, the device may look like a very compact visiting card-sized device that can be worn as a pendant 402 on a necklace or lanyard, for instance with the help of a metallic chain around the neck of a user 420. In an embodiment the device may be compact enough to be worn easily around a user's neck 420 as a pendant, as shown in FIG. 4. In the example shown, the pendant may comprise a parallelepiped with dimensions of approximately 70×45×23 mm.

Figure 5:
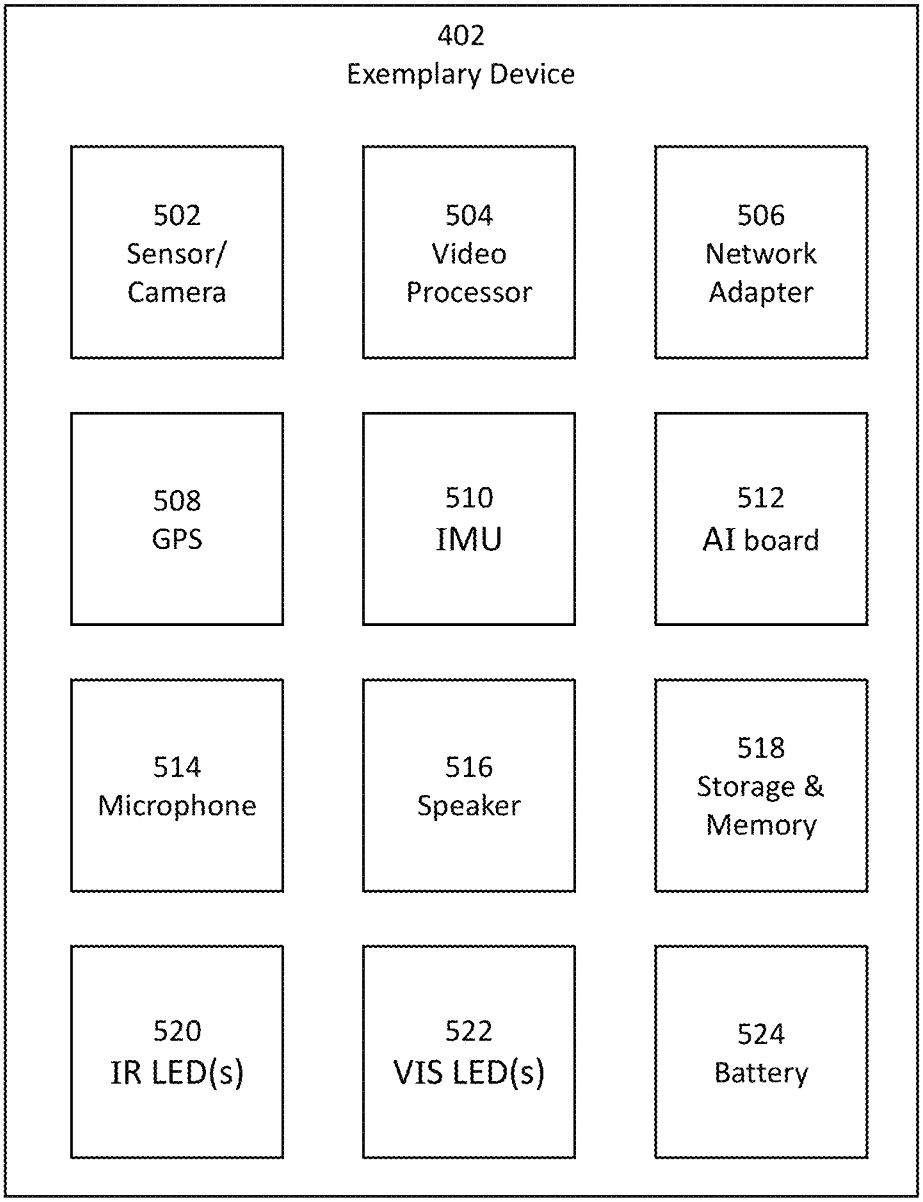
FIG. 5 illustrates a block diagram of various components of the device.

The system may comprise of other components. A block diagram of some exemplary components is illustrated in FIG. 5. FIG. 5 illustrates an exemplary device 500. The device 500 may comprise a sensor or camera 502. The device 500 may further comprise a video processor 504 for receiving the video stream and also pre-processing the incoming video frames. The device 500 may also comprise a network adapter 506 for communication with outside networks. The device 500 may further comprise a global positioning system element 508, an inertial motion unit 510, an artificial intelligence/central processing unit 512, a microphone 514, a speaker 516, storage and memory 518, IR light emitting diodes (LEDs) 520, visible LEDs 522, and a battery 526 for storing energy. The device 500 may have other components not depicted in the figure, for instance, a port for connecting to charge the battery, or a display to show the level of charge in the battery to user. The list of components shown in FIG. 5 is not meant to be exhaustive, but only by way of explanation.

To help Alzheimer's and Dementia patients, the AI-supported board may receive input from the live video feed of the micro camera affixed to the outside of the device. The device may employ high-end Neural Networks on the received video to detect and recognize the action being done. For this purpose, an action recognition model trained on, for instance, the Ego4D dataset may be employed. The action recognition will assist the patient to maintain their independence as it can constantly detect the action of the patient in real-time and keep reminding the patient of the current task and suggesting future and incomplete tasks to the patient. The device may be trained to provide suggestions through, for example, a voice output. The device may also include voice output in multiple languages, to help as many patients as possible.

The system may continuously identify the ongoing action but may only report the action when prompted to do so by a user question or request. The system may respond through audio or video, but it is anticipated that most responses will be in audio. To enable user queries or request, the system may comprise a microphone. The system can remind the user of the ongoing action. For instance, the user has a bottle of medicine in his hand and he forgets what he is supposed to do with that medicine. The system will detect the medicine and time of that event. If it is time for the user to take the medicine, the system will remind the user through audio (that audio may be in their loved one's voice rather than a mechanical voice). If the user is repeating the same action again, the system may detect and warn the user accordingly that he already took the medicine.

The system will be guiding the user for the immediate or the very near future events only. For example, if the user is standing still in front of the wardrobe for a certain time, the system can detect this relative inaction and may remind the user about picking out the clothes from the wardrobe. For example, if a user is standing still while holding a toothbrush in his hand, the user would be reminded by the system about brushing his teeth.

Figure 6:
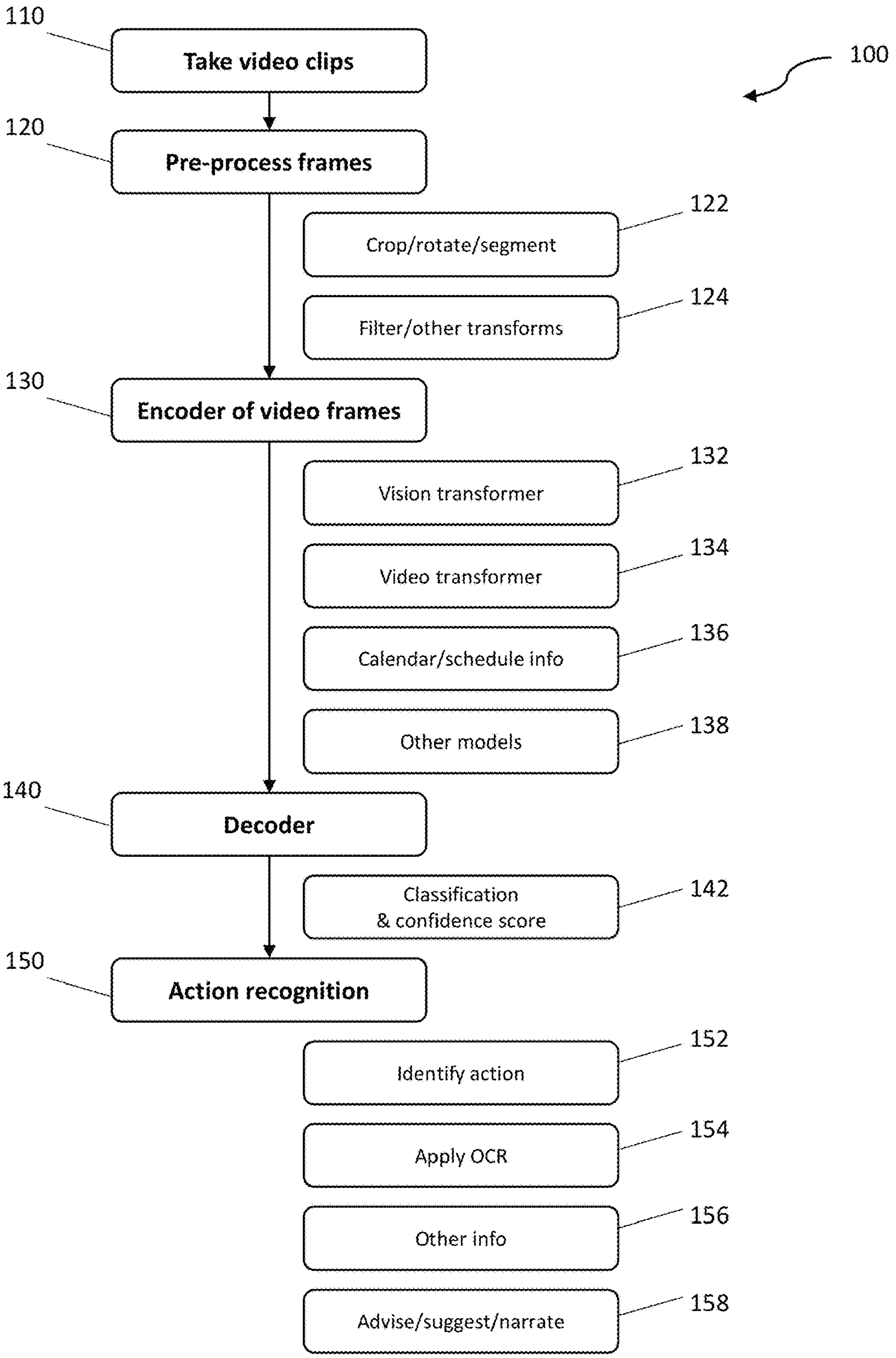
FIG. 6 illustrates some of the main process steps.
Figure 7:
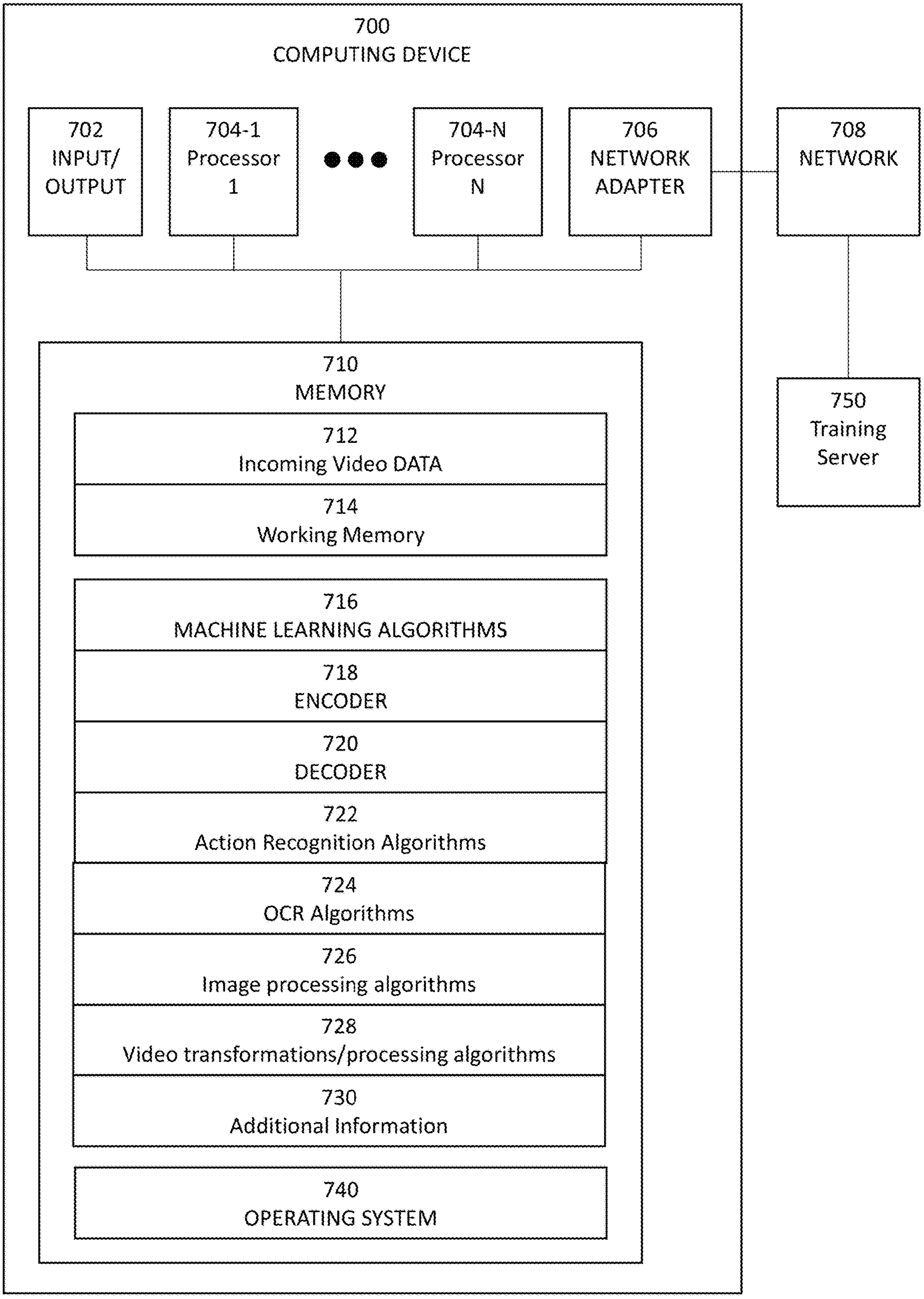
FIG. 7 illustrates an exemplary computing device.

FIG. 6 illustrates the overall process 100 again but with reference to some of the detailed steps which occur at each stage. For instance, a set of video frames 110 is received by the sensor. The video frames 110 are pre-processed 120. The pre-processing may comprise copy/rotate/segment steps 122 or filtering or other transformation 124. The video frames 110 may be encoded 130. The encoding 130 may comprise a vision transformer 132, a video transformer 143, calendar or schedule information 136, or other models 138. The decoder 140 may output a classification & a confidence score 142. The action recognition model 150 may comprise an identify action step 152, an apply optical character recognition (OCR) step 154, other information 156, and provide advice/a suggestion, or a narration 158.

Computer Systems and Components

The present systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor, for example processor 1 704-1 to processor N 704-N. Multi-tasking computing involves performing computing using more than one operating system task. A task is an operating system concept that refers to the combination of a program being executed, and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium 710 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium 710, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium 710 or to an external computer or external storage device via a network 708, for example, the Internet, a local area network, a wide area network and/or a wireless network. The network 708 may comprise copper transmission cables, optical transmission fibers, wireless transmission, routers, firewalls, switches, gateway computers, and/or edge servers. A network adapter card 706 or network interface in each computing/processing device receives computer readable program instructions from the network and forwards the computer readable program instructions for storage in a computer readable storage medium within the respective computing/processing device. The network 708 may provide connection to a remote server 750, where, for instance, the original models can be trained because the remote server 750 may have the proper computing resources to train a model on a large database of classified video clips. The model, once trained, may be loaded into the computing device memory 710.

In the memory 710 may also be stored an operating system 740 for interacting amongst the various components and assigning resources and schedules. In the memory 710 may also reside the incoming video data 712 as well as working memory 714. The memory may also store machine learning algorithms 716, an encoder 718, a decoder 720, action recognition algorithms 722, OCR algorithms 724, image processing algorithms 726, video transformations/processing algorithms 728, and additional information 730.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions.

Although specific embodiments of the present invention have been described, it may be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A device for use by a user suffering from a memory impairment disease, the device used by the user to assist the user in recognizing surroundings and actions of the user in order to remind the user of the task being performed by the suer, the device comprising:

an image sensor;

a speaker;

a power source; and a computing device comprising memory and a processor, with computer instructions stored in the memory, which, when executed by the processor perform the steps of:

receiving a series of images detected by the image sensor, wherein the images are from an area in front of the user;

processing the series of images;

applying a first algorithm to the processed series of images to classify the processed series of images as belonging to a selected action of a plurality of actions, wherein the first algorithm comprises at least the steps of;

pre-processing the series of images, wherein the pre-processing includes:

applying a transformation to the series of images;

encoding, via an encoder, the pre-processed series of images to create an embedding;

applying a decoder to the embedding to produce a plurality of labels on the series of images and a confidence score associated with each label of the plurality of labels, wherein the labels correspond with a prediction for human action of the user; and applying an action recognition model to select from the plurality of labels a most likely label, wherein the most likely label is based on the associated confidence score;

communicating by the speaker to the user the selected action;

applying a second algorithm to the processed series of images to predict the most likely following action of the plurality of actions relative to the selected action; and communicating by the speaker to the user the predicted following action.

2. The device of claim 1, further comprising an audio detection device for receiving a spoken instruction from the user.

3. The device of claim 2, wherein the processor further performs the step of determining an appropriate response by applying a natural language recognition algorithm to the user's spoken instruction.

4. The device of claim 1, wherein the decoder is pre-trained on a dataset of videos of people performing daily tasks.

5. The device of claim 1, wherein the action recognition model selects the label for the series of images are also based on additional information.

6. The device of claim 5, wherein the additional information comprises using a sliding window approach as part of selecting the label for the series of images.

7. The system of claim 1, wherein the transformation includes:

identifying regions of interest;

cropping the images to include the regions of interest; and resizing the image to send to the encoder.

8. The system of claim 1, wherein preprocessing further comprises creating a tensor to send to the encoder.

9. The system of claim 1, wherein the encoder is a video transformer.

10. The system of claim 1, wherein the embedding comprises providing a context representation of inputs.

11. A method for directing a user to complete a current action comprising: detecting a series of images from a camera worn by the user, wherein the camera takes images from an area in front of the user;

processing the series of images, the processing comprising:

pre-processing the series of images by applying a transformation to the series of images;

encoding, via an encoder, the pre-processed series of images to create an embedding; and applying a decoder to the embedding to produce a plurality of labels on the series of images and a confidence score associated with each label of the plurality of labels, wherein the labels correspond with a prediction for human action of the user;

classifying the processed series of images as belonging to a selected action of a plurality of actions by applying an action recognition model to select from the plurality of labels a most likely label, wherein the most likely label is based on the associated confidence score;

communicating to the user the selected action;

applying a second algorithm to the processed series of images to predict the most likely following action of the plurality of actions relative to the selected action; and communicating to the user the predicted following action.

12. The method of claim 11, further comprising the steps of:

receiving from the user a spoken instruction; and determining an appropriate response to the spoken instruction by applying a natural language recognition algorithm to the spoken instruction.

13. The method of claim 11, wherein the decoder is pre-trained on a dataset of videos of people performing daily tasks.

14. The method of claim 11, wherein the action recognition model further selects the label for the series of images also based on additional information.

15. The method of claim 14 wherein the additional information comprises using a sliding window approach as part of selecting the label for the series of images.

16. The system of claim 10, wherein the providing the context of representation of inputs comprises mapping discrete entities to points in a high-dimensional space in such a way that the distance between points is indicative of similarity between entities represented.

17. The system of claim 10, wherein the decoder further utilizes an attention mechanism which assigns weights to different parts of the inputs.

18. The method of claim 11, wherein preprocessing further comprises creating a tensor to send to the encoder.

19. The method of claim 11, wherein the embedding comprises providing a context representation of inputs by mapping discrete entities to points in a high-dimensional space in such a way that the distance between points is indicative of similarity between entities represented.

20. The method of claim 11, wherein the decoder further utilizes an attention mechanism which assigns weights to different parts of the inputs.

* * * * *